(12) United States Patent
Spitkovsky

(10) Patent No.: US 7,801,899 B1
(45) Date of Patent: Sep. 21, 2010

(54) MIXING ITEMS, SUCH AS AD TARGETING KEYWORD SUGGESTIONS, FROM HETEROGENEOUS SOURCES

(75) Inventor: Valentin Spitkovsky, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 454 days.

(21) Appl. No.: 10/957,337

(22) Filed: Oct. 1, 2004

(51) Int. Cl.
*G06F 17/30* (2006.01)
*G06F 7/00* (2006.01)
(52) U.S. Cl. .................. 707/748; 707/758; 705/14.4
(58) Field of Classification Search .................. 707/3; 709/219, 203; 705/14
See application file for complete search history.

(56) References Cited

U.S. PATENT DOCUMENTS

| | | | |
|---|---|---|---|
| 5,659,732 A * | 8/1997 | Kirsch ...................... 707/5 |
| 5,724,521 A | 3/1998 | Dedrick |
| 5,740,549 A | 4/1998 | Reilly et al. |
| 5,848,397 A | 12/1998 | Marsh et al. |
| 5,948,061 A * | 9/1999 | Merriman et al. ........... 709/219 |
| 6,026,368 A | 2/2000 | Brown et al. |
| 6,044,376 A | 3/2000 | Kurtzman, II |
| 6,078,914 A | 6/2000 | Redfern |
| 6,144,944 A | 11/2000 | Kurtzman, II et al. |
| 6,167,382 A | 12/2000 | Sparks et al. |
| 6,269,361 B1 | 7/2001 | Davis et al. |
| 6,401,075 B1 | 6/2002 | Mason et al. |
| 6,584,492 B1 * | 6/2003 | Cezar et al. ................. 709/203 |
| 6,985,882 B1 | 1/2006 | Del Sesto |
| 7,039,599 B2 | 5/2006 | Merriman |
| 7,136,875 B2 | 11/2006 | Anderson et al. |
| 2003/0149937 A1 * | 8/2003 | McElfresh et al. .......... 715/517 |

(Continued)

FOREIGN PATENT DOCUMENTS

WO    WO 97/21183    6/1997

(Continued)

OTHER PUBLICATIONS

Gravano et al., "Merging Ranks from Heterogeneous Internet Sources," 1997, Proceedings of the 23rd VLDB Conference, pp. 196-205.*

(Continued)

*Primary Examiner*—John R. Cottingham
*Assistant Examiner*—Michael Pham
(74) *Attorney, Agent, or Firm*—Fish & Richardson P.C.

(57) ABSTRACT

The way in which targeting keywords are suggested to advertisers, particularly in instances where different suggestion tools or techniques provide a number of different sets of targeting keyword suggestions, may be improved by (a) accepting at least two heterogeneous sets of suggestions (where each of the sets of suggestions includes suggestions that are ranked and/or scored), (b) determining, for each of the sets of suggestions, a new score for each of the suggestions of the set, where the new score combines an cardinal aspect of the suggestion and an ordinal aspect of the suggestion, and (c) combining at least some of the suggestions from each of the sets using the new scores to generate a final set of ordered and/or scored suggestions. Each of the suggestions may include information for targeting the serving of an online advertisement. For example, each of the suggestions may include a keyword for targeting the serving of an online advertisement. Each of the suggestions may include a keyword type.

18 Claims, 7 Drawing Sheets

U.S. PATENT DOCUMENTS

| | | | |
|---|---|---|---|
| 2003/0233274 A1* | 12/2003 | Urken et al. | 705/12 |
| 2004/0107363 A1* | 6/2004 | Monteverde | 713/201 |
| 2005/0091106 A1* | 4/2005 | Reller et al. | 705/14 |
| 2005/0222900 A1* | 10/2005 | Fuloria et al. | 705/14 |
| 2005/0251444 A1* | 11/2005 | Varian et al. | 705/14 |
| 2008/0033938 A1* | 2/2008 | Okamoto et al. | 707/5 |
| 2008/0103893 A1* | 5/2008 | Nagarajan et al. | 705/14 |

FOREIGN PATENT DOCUMENTS

WO      WO 01/44992 A1 *   6/2001

OTHER PUBLICATIONS

Rui et al., "Relevance Feedback Techniques in Interactive Content-Based Image Retrieval," 1998, Beckman Institute and Department of Computer Science, University of Illinois at Urbana-Champaign, pp. 1-12.*

Li, Yanhong, "Toward a Qualitative Search Engine," Jul./Aug. 1998, IEEE Internet Computing, pp. 24-29.*

Zhu, Xiaolan et al., "Incorporating Quality Metrics in Centralized/Distributed Information Retrieval on teh World Wide Web," 2000, ACM, pp. 288-295.*

Kirsch, Steve, "Infoseek's Experiences Searching the Internet," 1998, Infoseek Corporation, pp. 3-7.*

Hinloopen et al., "Integration of Ordinal and Cardinal Information in Multi-Criteria Ranking with Imperfect Compensation", Available Online Oct. 8, 2003, European Journal of Operational Research, 2003, pp. 317-338.*

Hinloopen, Edwin et al., "Qualitative Multiple Criteria Choice Analysis: The Dominant Regime Method," 1990, Quality & Quantity, pp. 37-56.*

U.S. Appl. No. 95/001,073, filed Sep. 30, 2004, Reexamination of Stone et al.

U.S. Appl. No. 95/001,061, filed Sep. 3, 2002, Reexamination of Stone et al.

U.S. Appl. No. 95/001,069, filed Jul. 11, 2002, Reexamination of Dean et al.

U.S. Appl. No. 95/001,068, filed Dec. 7, 2002, Reexamination of Stone et al.

AdForce, Inc., A Complete Guide to AdForce, Version 2.6, 1998.

AdForce, Inc., S-1/A SEC Filing, May 6, 1999.

AdKnowledge Campaign Manager: Reviewer's Guide, AdKnowledge, Aug. 1998.

AdKnowledge Market Match Planner: Reviewer's Guide, AdKnowledge, May 1998.

Ad-Star.com website archive from www. Archive.org, Apr. 12, 1997 and Feb. 1, 1997.

Baseview Products, Inc., AdManagerPro Administration Manual v. 2.0, Dec. 1998.

Baseview Products, Inc., ClassManagerPro Administration Manual v. 1.0.5, Feb. 1, 1997.

Business Wire, "Global Network, Inc. Enters Into Agreement in Principle With Major Advertising Agency," Oct. 4, 1999.

Information Access Technologies, Inc., Aaddzz brochure, "The Best Way to Buy and Sell Web Advertising Space," © 1997.

Information Access Technologies, Inc., Aaddzz.com website archive from www. Archive.org, archived on Jan. 30, 1998.

Zeff, R. et al., Advertising on the Internet, 2nd Ed., John Wiley & Sons, 1999.

Dedrick, R., Interactive Electronic Advertising, IEEE, 1994.

Dedrick, R., A Consumption Model for Targeted Electronic Advertising, Intel Architecture Labs, IEEE, 1995.

Request for Reexamination of U.S. Patent No. 7,240,025 B2, U.S. Appl. No. 95/001,073, Jul. 30, 2008.

Request for Reexamination of U.S. Patent No. 6,446,045 B1, U.S. Appl. No. 95/001,061, Jul. 7, 2008.

Request for Reexamination of U.S. Patent No. 7,249,059 B2, U.S. Appl. No. 95/001,069, Jul. 21, 2008.

Request for Reexamination of U.S. Patent No. 6,829,587 B2, U.S. Appl. No. 95/001,068, Jul. 14, 2008.

* cited by examiner

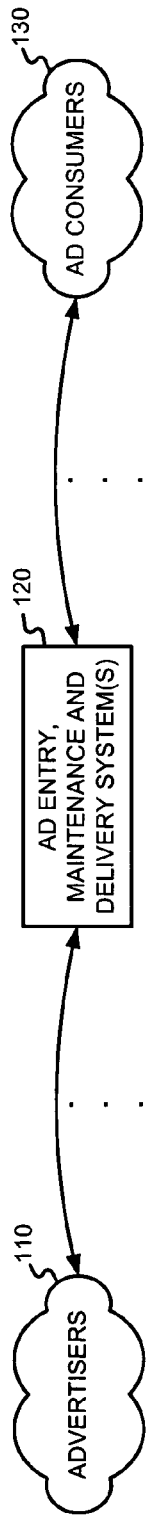
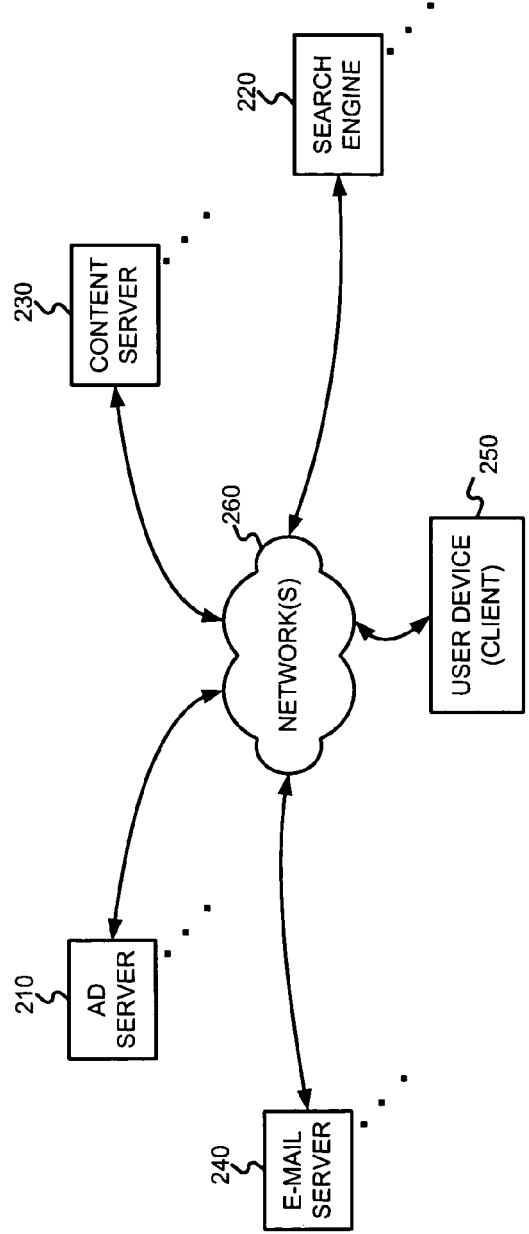

MIXING ITEMS, SUCH AS AD TARGETING KEYWORD SUGGESTIONS, FROM HETEROGENEOUS SOURCES

§1. BACKGROUND OF THE INVENTION

§1.1 Field of the Invention

The present invention concerns advertisements ("ads"), such as ads served in an online environment. In particular, the present invention concerns helping advertisers to develop better online ad campaigns.

§1.2 Background Information

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Interactive advertising provides opportunities for advertisers to target their ads to a receptive audience. That is, targeted ads are more likely to be useful to end users since the ads may be relevant to a need inferred from some user activity (e.g., relevant to a user's search query to a search engine, relevant to content in a document requested by the user, etc.) Query keyword relevant advertising has been used by search engines. One example of a query keyword relevant advertising system is the AdWords advertising system by Google of Mountain View, Calif. Similarly, content-relevant advertising systems have been proposed. For example, U.S. patent application Ser. Nos. 10/314,427 (incorporated herein by reference and referred to as "the '427 application") titled "METHODS AND APPARATUS FOR SERVING RELEVANT ADVERTISEMENTS", filed on Dec. 6, 2002 and listing Jeffrey A. Dean, Georges R. Harik and Paul Bucheit as inventors, and 10/375,900 (incorporated by reference and referred to as "the '900 application") titled "SERVING ADVERTISEMENTS BASED ON CONTENT," filed on Feb. 26, 2003 and listing Darrell Anderson, Paul Bucheit, Alex Carobus, Claire Cui, Jeffrey A. Dean, Georges R. Harik, Deepak Jindal and Narayanan Shivakumar as inventors, describe methods and apparatus for serving ads relevant to the content of a document, such as a Web page for example. The AdSense system by Google is an example of a content-relevant advertising system.

In many online ad systems, one or more ads are displayed in association with a document, such as a search results page, or a Webpage with content for example. Typically, online ads include embedded information (e.g., links) such that when the ad is selected (e.g., by a user clicking on the ad), a browser is loaded with a document (e.g., a Webpage) associated with the ad. Such a document is commonly referred to as the "landing page" of the ad.

Targeted ads may include one or more serving criteria, such as targeting keywords. In some ad delivery systems, there are different types of keywords. For example, if "Broad Match" targeting keyword or keyword phrase is used, the ad may be served when users search for the keyword, in any order, and possibly along with other terms. The ads may also be served automatically for expanded matches, including plurals and relevant variations. If "Phrase Match" targeting is used, the ad may be served when a user searches on the phrase (with the words in the same order as the phrase), even if the query includes other terms. If "Exact Match" targeting is used, the ad may be served when users search for the specific phrase, without any other terms in the query. If "Negative Keyword" targeting is used (bound to either a phrase or word), the ad will not be served in connection with any queries containing the keywords being negated.

Selecting targeting keywords to meet each advertiser's goals may be difficult. Various targeting keyword suggestion tools are possible. For example, U.S. patent application Ser. No. 10/389,688 (incorporated herein by reference), titled "SUGGESTING AND/OR PROVIDING AD SERVING CONSTRAINT INFORMATION", filed on Mar. 14, 2003, and listing Jeffrey A. Dean, Georges R. Harik and Paul Bucheit as inventors, U.S. patent application Ser. No. 10/419,692 (incorporated herein by reference), titled "DETERMINING CONTEXTUAL INFORMATION FOR ADVERTISEMENTS AND USING SUCH DETERMINED CONTEXTUAL INFORMATION TO SUGGEST TARGETING CRITERIA AND/OR IN THE SERVING OF ADVERTISEMENTS", filed on Apr. 21, 2003, and listing Amit Singhal, Mehran Sahami, Amit Patel and Stephen Lawrence as the inventors, and U.S. patent application Ser. No. 10/750,451 (incorporated herein by reference), titled "SUGGESTING AND/OR PROVIDING TARGETING CRITERIA FOR ADVERTISEMENTS", filed on Dec. 31, 2003, and listing Ross Koningstein, Valentin Spitkovsky, Georges R. Harik and Noam Shazeer as inventors, describe various ways of suggesting targeting keywords.

Sometimes, the number of targeting keyword suggestions can be large. Further, some targeting keywords may be better suggestions than others. Accordingly, it may be desirable to score the suggested targeting keywords and sort them using their scores. Thus, if a large number of targeting keyword suggestions are to be presented to an advertiser, the best suggestions should be presented first. Unfortunately, however, if targeting keyword suggestions come from different sources that use different scores, it is challenging to combine the targeting keyword suggestions in a way that is meaningful to an advertiser.

In view of the foregoing, it would be useful to improve the way in which targeting keywords are suggested to advertisers, particularly in instances where different suggestion tools or techniques provide a number of different sets of targeting keyword suggestions.

§2. SUMMARY OF THE INVENTION

The present invention may be used to improve the way in which targeting keywords are suggested to advertisers, particularly in instances where different suggestion tools or techniques provide a number of different sets of targeting keyword suggestions. For example, at least some embodiments consistent with the present invention may (a) accept at least two heterogeneous sets of suggestions (where each of the sets of suggestions includes suggestions that are ranked and/or scored), (b) determine, for each of the sets of suggestions, a new score for each of the suggestions of the set, where the new score combines an cardinal aspect of the suggestion and an ordinal aspect of the suggestion, and (c) combine at least some of the suggestions from each of the sets using the new scores to generate a final set of ordered and/or scored suggestions.

In at least some embodiments consistent with the present invention, each of the suggestions may include information for targeting the serving of an online advertisement. For example, each of the suggestions may include a keyword for targeting the serving of an online advertisement. Each of the suggestions may include a keyword type.

In at least some embodiments consistent with the present invention, suggestions may be filtered. For example, keyword suggestions belonging to an unwanted keyword type may be removed. As another example, suggestions that are trademarks may be removed. As yet another example, suggestions determined to be bad words may be removed. As still another example, suggestions in a certain language may be removed.

In at least some embodiments consistent with the present invention, for each of the at least two sets of suggestions, and for each new score for each of the suggestions of the set, the new score may be adjusted to generate an adjusted new score so that a sum of the adjusted new scores for each of the sets equals the same value. Alternatively, or in addition, the new scores may be adjusted to generate adjusted new scores so that a sum of the adjusted new score for each of the sets equals one. Alternatively, or in addition, the new scores may be adjusted to generate adjusted new scores using a trust factor of a tool that was used to generate the set of suggestions.

§3. BRIEF DESCRIPTION OF THE DRAWINGS

FIG. 1 is a high-level diagram showing parties or entities that can interact with an advertising system.

FIG. 2 is a diagram illustrating an environment in which, or with which, the present invention may operate.

§4. DETAILED DESCRIPTION

Figure 3:
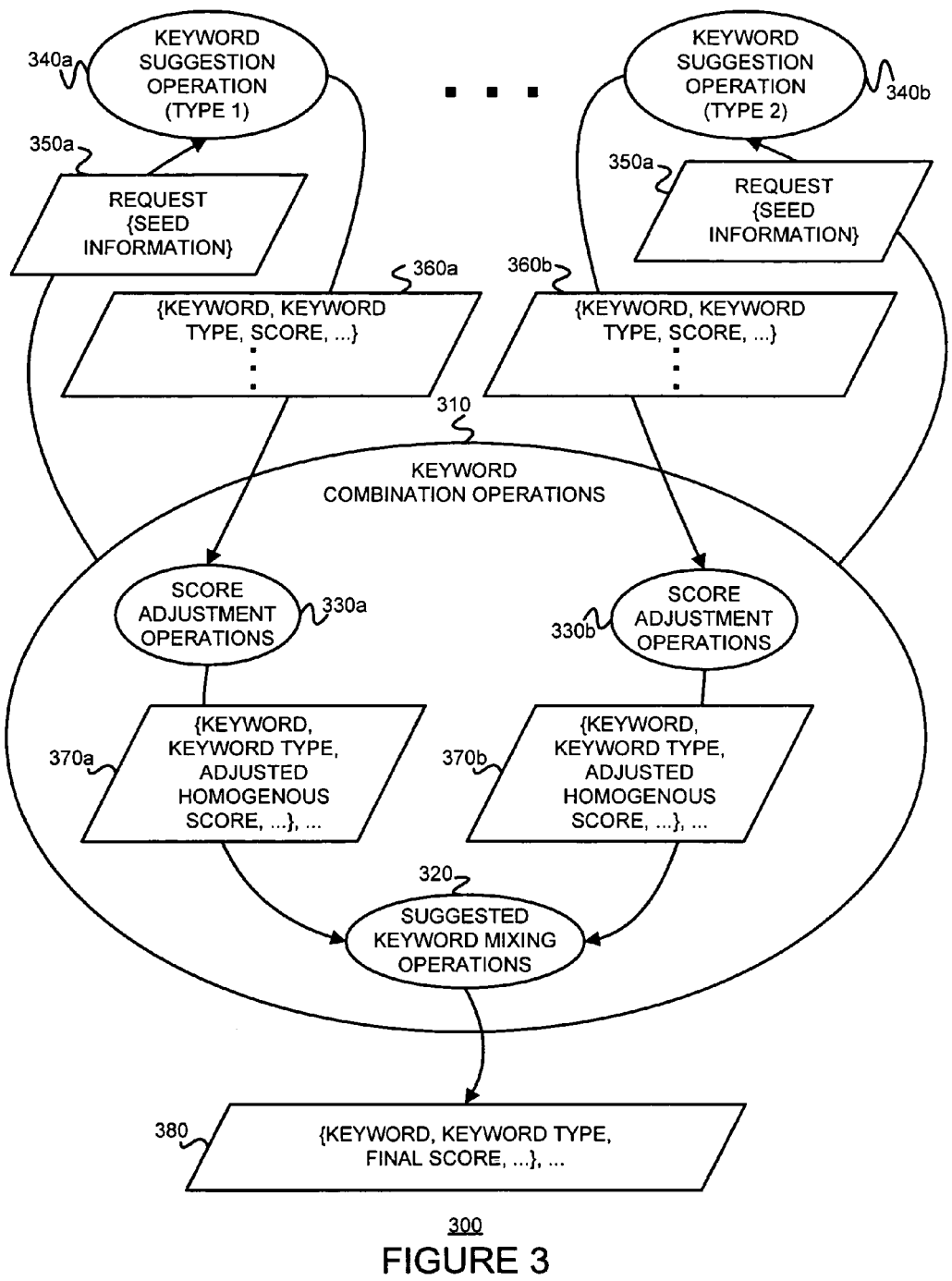
FIG. 3 is a bubble diagram illustrating operations that may be performed in a manner consistent with the present invention, as well as information that may be generated and/or used by such operations.

The present invention may involve novel methods, apparatus, message formats, and/or data structures for combining various items, such as targeting keyword suggestions, from multiple sources. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act.

Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventor regards his invention as any patentable subject matter described.

In the following, definitions that may be used in the specification are provided in §4.1. Then, environments in which, or with which, embodiments consistent with the present invention may operate are described in §4.2. Then, exemplary embodiments consistent with the present invention are described in §4.3. An example illustrating operations in an exemplary embodiment consistent with the present invention is provided in §4.4. Finally, some conclusions regarding the present invention are set forth in §4.5.

§4.1 DEFINITIONS

Online ads may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a document on which, or with which, the ad was served, a search query or search results associated with the serving of the ad, a user characteristic (e.g., their geographic location, the language used by the user, the type of browser used, previous page views, previous behavior, user account, any Web cookies used by the system, user device characteristics, etc.), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain location, etc. As another example, in some systems, an advertiser may specify that its ad is to be served only if a page or search query includes certain keywords or phrases. As yet another example, in some systems, an advertiser may specify that its ad is to be served only if a document being served includes certain topics or concepts, or falls under a particular cluster or clusters, or some other classification or classifications. Further, in some systems, an advertiser may specify that its ad is to be served only to (or is not to be served to) user devices having certain characteristics.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

The ratio of the number of selections (e.g., clickthroughs) of an ad to the number of impressions of the ad (i.e., the number of times an ad is rendered) is defined as the "selection rate" (or "clickthrough rate") of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Often, if user actions don't indicate a consummated purchase, they may indicate a sales lead, although user actions constituting a conversion are not limited to this. Indeed, many other definitions of what constitutes a conversion are possible.

The ratio of the number of conversions to the number of impressions of the ad (i.e., the number of times an ad is rendered) is referred to as the "conversion rate." If a conversion is defined to be able to occur within a predetermined time since the serving of an ad, one possible definition of the conversion rate might only consider ads that have been served more than the predetermined time in the past.

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as JavaScript, etc.). In many cases, a document has an addressable storage location and can therefore be uniquely identified by this addressable location. A universal resource locator (URL) is an address used to access information on the Internet.

"Document information" may include any information included in the document, information derivable from information included in the document (referred to as "document derived information"), and/or information related to the document (referred to as "document related information"), as well an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer, Netscape, Opera, Mozilla), a media player (e.g., an MP3 player, a Realnetworks streaming audio file player, etc.), a viewer (e.g., an Abobe Acrobat pdf reader), etc.

A "content owner" is a person or entity that has some property right in the content of a document. A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary.

"User information" may include user behavior information and/or user profile information.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

As used in this specification, "suggestion" should be broadly interpreted to include both an item recommended to a user, as well as an item that is automatically used, without the need for user approval.

§4.2 EXEMPLARY ADVERTISING ENVIRONMENTS IN WHICH, OR WITH WHICH, EMBODIMENTS CONSISTENT WITH THE PRESENT INVENTION MAY OPERATE

FIG. 1 is a high level diagram of an advertising environment. The environment may include an ad entry, maintenance and delivery system (simply referred to as an ad server) 120. Advertisers 110 may directly, or indirectly, enter, maintain, and track ad information in the system 120. The ads may be in the form of graphical ads such as so-called banner ads, text only ads, image ads, audio ads, video ads, ads combining one of more of any of such components, etc. The ads may also include embedded information, such as a link, and/or machine executable instructions. Ad consumers 130 may submit requests for ads to, accept ads responsive to their request from, and provide usage information to, the system 120. An entity other than an ad consumer 130 may initiate a request for ads. Although not shown, other entities may provide usage information (e.g., whether or not a conversion or selection related to the ad occurred) to the system 120. This usage information may include measured or observed user behavior related to ads that have been served.

The ad server 120 may be similar to the one described in FIG. 2 of the '900 application. An advertising program may include information concerning accounts, campaigns, creatives, targeting, etc. The term "account" relates to information for a given advertiser (e.g., a unique e-mail address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line may have one or more ad groups, each containing one or more ads. Each ad group may include targeting information (e.g., a set of keywords, a set of one or more topics, geolocation information, user profile information, user device characteristics, etc.), and price or offer information (e.g., maximum cost or cost per selection, maximum cost or cost per conversion, etc.)). Alternatively, or in addition, each ad group may include an average cost (e.g., average cost per selection, average cost per conversion, etc.). Therefore, a single maximum cost and/or a single average cost may be associated with one or more keywords, and/or topics. As stated, each ad group may have one or more ads or "creatives" (That is, ad content that is ultimately rendered to an end user.). Each ad may also include a link to a URL (e.g., a landing Web page, such as the home page of an advertiser, or a Web page associated with a particular product or server) and/or a telephone number. Naturally, the ad information may include more or less information, and may be organized in a number of different ways.

FIG. 2 illustrates an environment 200 in which the present invention may be used. A user device (also referred to as a "client" or "client device") 250 may include a browser facility (such as the Explorer and pocket-PC Explorer browsers from Microsoft, the Opera Web Browser from Opera Software of Norway, the Navigator browser from AOL/Time Warner, the Mozilla browser, etc.), an e-mail facility (e.g., Outlook from Microsoft), etc. A search engine 220 may permit user devices 250 to search collections of documents (e.g., Web pages). A content server 230 may permit user devices 250 to access documents. An e-mail server (such as GMail from Google, Hotmail from Microsoft Network, Yahoo Mail, etc.) 240 may be used to provide e-mail functionality to user devices 250. An ad server 210 may be used to serve ads to user devices 250. The ads may be served in association with search results provided by the search engine 220. However, content-relevant ads may be served in association with content provided by the content server 230, and/or e-mail supported by the e-mail server 240 and/or user device e-mail facilities.

As discussed in the '900 application (introduced above), ads may be targeted to documents served by content servers. Thus, one example of an ad consumer 130 is a general content server 230 that receives requests for documents (e.g., articles, discussion threads, music, video, graphics, search results, Web page listings, etc.), and retrieves the requested document in response to, or otherwise services, the request. The content server may submit a request for ads to the ad server 120/210. Such an ad request may include a number of ads desired. The ad request may also include document request information. This information may include the document itself (e.g., page), a category or topic corresponding to the content of the document or the document request (e.g., arts, business, computers, arts-movies, arts-music, etc.), part or all of the document request, content age, content type (e.g., text, graphics, video, audio, mixed media, etc.), geo-location information, document information, user device characteristics, etc.

The content server 230 may combine the requested document with one or more of the advertisements provided by the ad server 120/210. This combined information including the document content and advertisement(s) is then forwarded towards the end user device 250 that requested the document, for presentation to the user. Finally, the content server 230 may transmit information about the ads and how, when, and/or where the ads are to be rendered (e.g., position, selection or not, impression time, impression date, size, conversion or not, end user device characteristics, etc.) back to the ad server 120/210. Alternatively, or in addition, such information may be provided back to the ad server 120/210 by some other means.

Another example of an ad consumer 130 is the search engine 220. A search engine 220 may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine 220 may submit a request for ads to the ad server 120/210. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate, and/or as described below, information related to, and/or derived from, the search query), user device characteristics, and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, topics of identified documents, feature vectors of identified documents, etc. The request may also include end user device characteristics.

The search engine 220 may combine the search results with one or more of the advertisements provided by the ad server 120/210. This combined information including the search results and advertisement(s) is then forwarded towards the user that submitted the search, for presentation to the user. Preferably, the search results are maintained as distinct from the ads, so as not to confuse the user between paid advertisements and presumably neutral search results.

Finally, the search engine 220 may transmit information about the ad and when, where, and/or how the ad was to be rendered (e.g., position, selection or not, impression time, impression date, size, conversion or not, end user device characteristics, etc.) back to the ad server 120/210. As described below, such information may include information for determining on what basis the ad was determined relevant (e.g., strict or relaxed match, or exact, phrase, or broad match, etc.) Alternatively, or in addition, such information may be provided back to the ad server 120/210 by some other means.

Finally, the e-mail server 240 may be thought of, generally, as a content server in which a document served is simply an e-mail. Further, e-mail applications (such as Microsoft Outlook for example) may be used to send and/or receive e-mail. Therefore, an e-mail server 240 or application may be thought of as an ad consumer 130. Thus, e-mails may be thought of as documents, and targeted ads may be served in association with such documents. For example, one or more ads may be served in, under over, or otherwise in association with an e-mail.

Although the foregoing examples described servers as (i) requesting ads, and (ii) combining them with content, one or both of these operations may be performed by a client device (such as an end user computer for example).

§4.3 EXEMPLARY EMBODIMENTS

FIG. 3 is a bubble diagram illustrating operations that may be performed in a manner consistent with the present invention, as well as information that may be generated and/or used by such operations. As shown, two or more keyword suggestion operations 340, as well as keyword combination operations 310, may be provided. The keyword combination operations 310 may include two or more score adjustment operations 330, as well as suggested keyword mixing operations 320.

Keyword combination operations 310 (or some other operations, not shown) may submit one or more requests for keyword suggestions 350 to one or more of the keyword suggestion operations 340. Each of the requests 350 may include "seed" information; that is, information from which keyword suggestions may be generated. Examples of seed information may include ad creative information, existing targeting keywords, ad landing page information, etc.

Each of the at least two keyword suggestion operations 340 provide results 360 to the keyword combination operations 310. The results 360 may include one or more suggested keywords. Each of the suggested keywords may include the targeting keyword suggestion, a suggestion type (e.g., refinement, broadening, expansion, negative, etc.) and a homogeneous (intraset) score. Each of the results 360 may be provided to (e.g., a separate instance of) score adjustment operations 330. The score adjustment operations 330 may be used to adjust the homogeneous (intraset) scores so that suggested targeting keywords scored by suggestion operations of one type can be compared and combined with suggested targeting keywords scored by suggestion operations of another type.

Sets of results with adjusted scores 370 may be provided to suggested keyword mixing operations 320, which generate a final set of targeting keyword suggestions 380. The sets of results with adjusted scores 370 may include one or more targeting keyword suggestions, each of which may have an associated suggestion type and an associated adjusted final (intraset) score. The final set of targeting keyword suggestions 380 may include one or more targeting keyword suggestions, each of which may have an associated suggestion type and a final (intraset) score.

§4.3.1 Exemplary Methods

Figure 4:
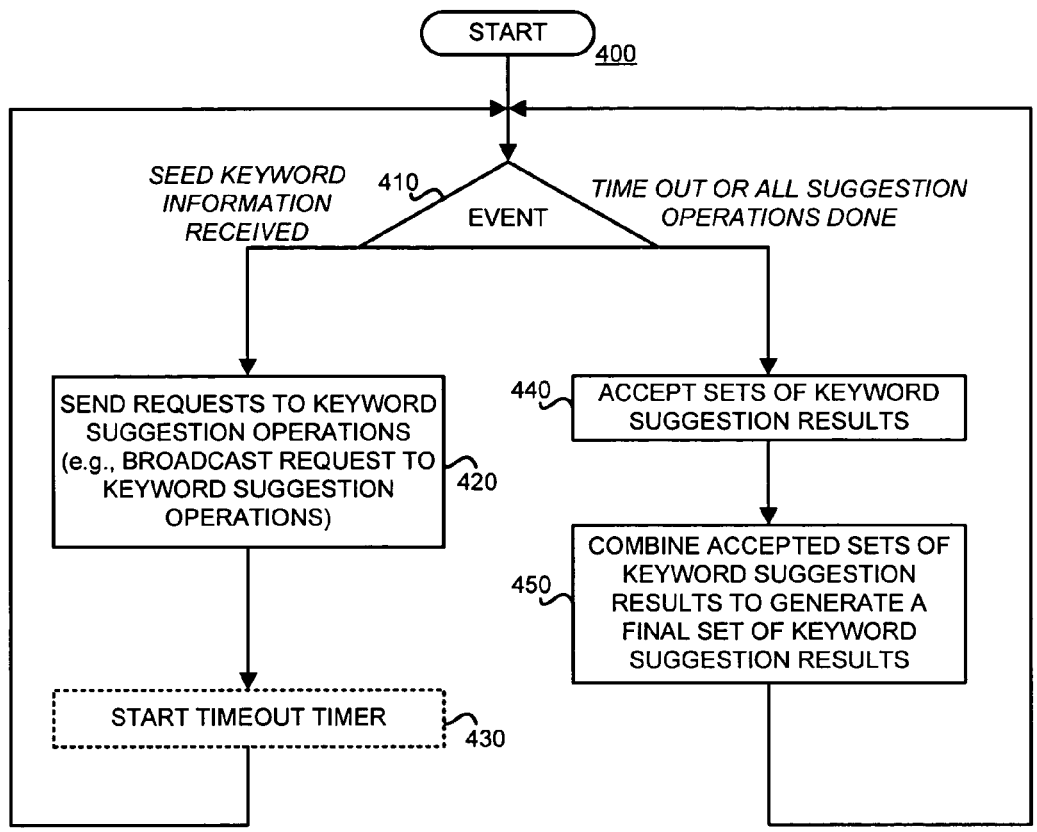
FIG. 4 is a flow diagram of an exemplary method for various operations in a manner consistent with the present invention.

FIG. 4 is a flow diagram of an exemplary method 400 that may be used to perform various operations in a manner consistent with the present invention. Various branches of the method 400 may be performed in response to the occurrence of various events. (Event block 410) For example, if seed keyword information is received, requests may be sent to two or more keyword suggestion operations. (Block 420) A time-out timer may be started. (Block 430) If, on the other hand, a time-out occurs (e.g., the time-out timer expires), or if all suggestion operations are done, the sets of keyword suggestion results may be accepted (Block 440) and combined to generate a final set of keyword suggestion results (Block 450). Although not shown, the final set of targeting keyword suggestions may be rendered to an advertiser.

Referring back to block 420, the request may be broadcast to each of the two or more keyword suggestion operations.

Referring back to block 450, the act of generating a final set of targeting keyword suggestion results may include rescoring results from the individual keyword suggestion operations and mixing the rescored results. In at least one embodiment consistent with the present invention, the result returned may be a list of targeting keyword suggestions. Each suggestion may include a keyword string, and one or more of a keyword type, a score, and a language identification. Positive keywords (i.e., keywords used to target the serving of ads) may also contain lists of negations (e.g., keywords used to prohibit the serving of ads).

Figure 5:
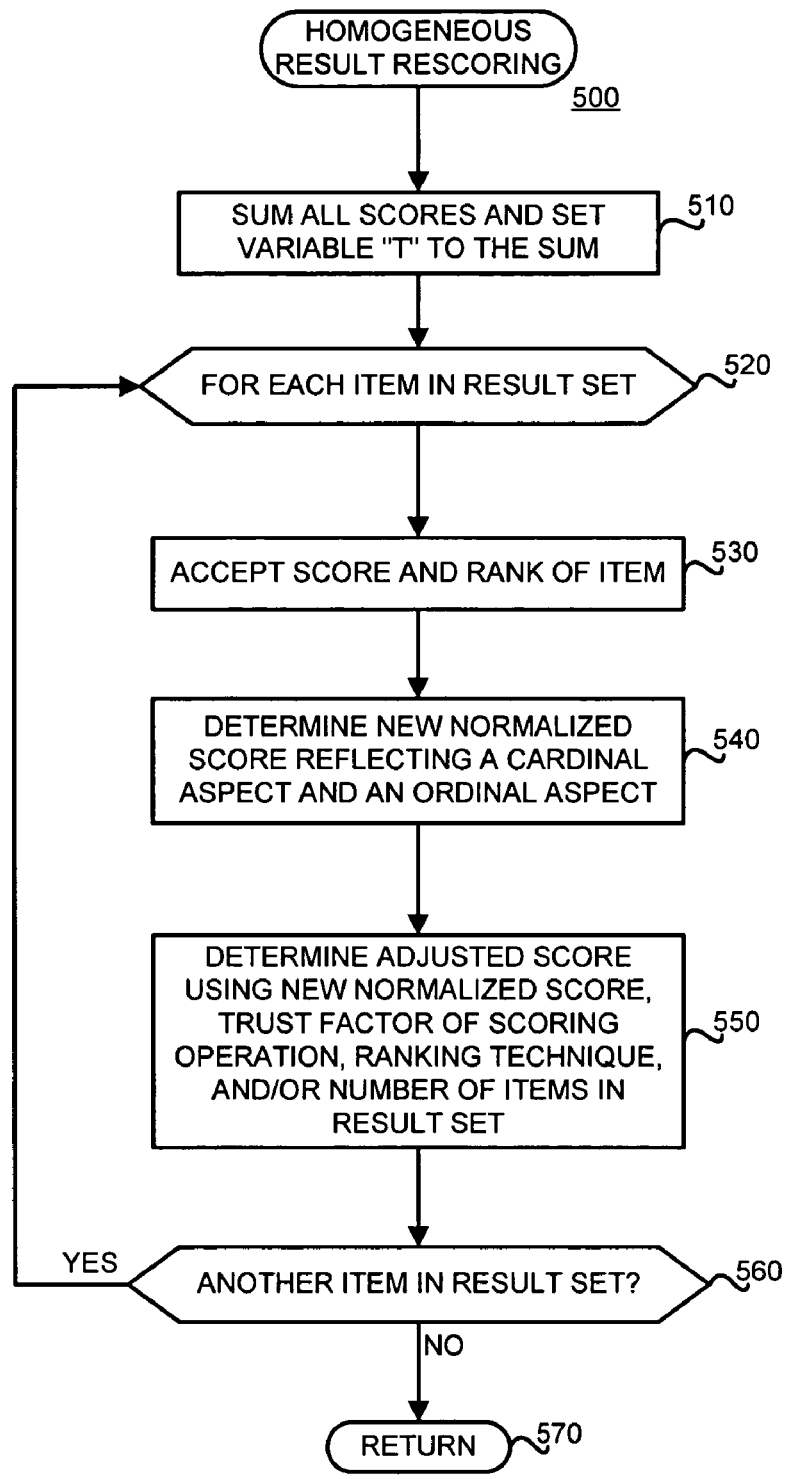
FIG. 5 is a flow diagram of an exemplary method for rescoring homogeneous items (e.g., targeting keyword suggestions from one source) in a manner consistent with the present invention.

FIG. 5 is a flow diagram of an exemplary method 500 for rescoring homogeneous (intraset) items (e.g., targeting keyword suggestions from one source) in a manner consistent with the present invention. All of the scores are summed and a variable (T) is set to the sum. (Block 510) Then, as indicated by loop 520 560, a number of acts are performed for each item in the result set. For example, the score and rank of an item may be accepted. (Block 530) A new normalized score, reflecting a cardinal aspect and an ordinal aspect, may then be determined for the item. (Block 540) An adjusted score for the item may then be determined using the new normalized score, as well as a trust factor of the scoring operation, a ranking technique, and/or a number of items in the result set. (Block 550) When all of the items in the results set have been processed, the method 500 may be left. (Node 570).

The method 500, or an instance of the method 500, may be provided for each of the score adjustment operations 330.

Referring back to block 540, incorporating both the cardinal qualities (absolute scores) and the ordinal qualities (ordering of the results) accommodates suggestion tools that may simply order results (e.g., saying x is better than y, without saying by how much). In at least one embodiment consistent with the present invention, the new normalized score may be composed of 50% (or some other weight) of the cardinal aspect, and 50% (or some other weight, where the weights sum to 100%) of the ordinal aspect. In at least one embodiment consistent with the present invention, the cardinal aspect may be the original score divided by the variable T. In at least one embodiment consistent with the present invention, the ordinal aspect may be defined as:

$$\left( \frac{\frac{1}{rank_{item}}}{\sum_{for\ all\ items_j} \frac{1}{rank_{item_j}}} \right) \quad (1)$$

Thus, in one embodiment consistent with the present invention, the new score of item "i" of suggestion tool "j" may be defined as:

$$S_{new:i,j} = 0.50\left(\frac{S_{i,j}}{T_j}\right) + 0.50\left(\frac{\frac{1}{rank_{item}}}{\sum_{for\ all\ items_j}\frac{1}{rank_{item\ j}}}\right) \quad (2)$$

Referring back to block 550, to avoid disproportional scores for (possibly poor) suggestion tools that return very few results, the total score for all results from a suggestion tool may be forced to add to one. Thus, the new scores may be multiplied by a number that grows arbitrarily large as the number of results from a suggestion tool grows. To do this, a harmonic (e.g., 1+1/2+ . . . +1/n, where n is the MIN of the number of results returned by the suggestion tool and the number of results requested) may be used. As mentioned, the new scores may also be multiplied by a trustworthiness factor associated with the suggestion tool. Thus, an adjusted score may be determined as follows:

$$S_{adjusted:i,j} = S_{new:i,j} \cdot trust\ factor_j \cdot \left(1 + \frac{1}{2} + \ldots + \frac{1}{n}\right) \quad (3)$$

Assigning a factor of trustworthiness to each suggestion tool (e.g., as a weight) is advantageous in that new experimental suggestion tools can be added with very low trustworthiness factor weights so as not to affect the final suggestion results too much initially. If a new experimental suggestion tool proves to work well, its trustworthiness factor weight can be increased.

The trustworthiness factor weight of a suggestion tool may also be adjusted using feedback. Such feedback may include, for example, what suggestions the user actually ends up using, or what suggestion tools generated the suggestions that the user actually ends up using. Thus, if a user ends up using suggestions (or a large number, or large proportion of suggestions) from a suggestion tool, the trustworthiness factor weight of the suggestion tool may be increased. Conversely, if a user ends up using no suggestions (or only a few suggestions, or a low proportion of suggestions) from a suggestion tool, the trustworthiness factor weight of the suggestion tool may be decreased. Alternatively, or in addition, such feedback may include how well the suggestions end up performing. For example, in the context of an online advertising system, the performance of ads triggered by a suggested targeting keyword can be tracked. If the ad performs well when the suggested keyword is used (or perhaps better than when other, non-suggested, keywords are used), the trustworthiness factor weight of the associated suggestion tool may be increased. Conversely, if the ad performs poorly when the suggested keyword is used (or perhaps worse than when other, non-suggested, keywords are used), the trustworthiness factor weight of the associated suggestion tool may be decreased.

Figure 6:
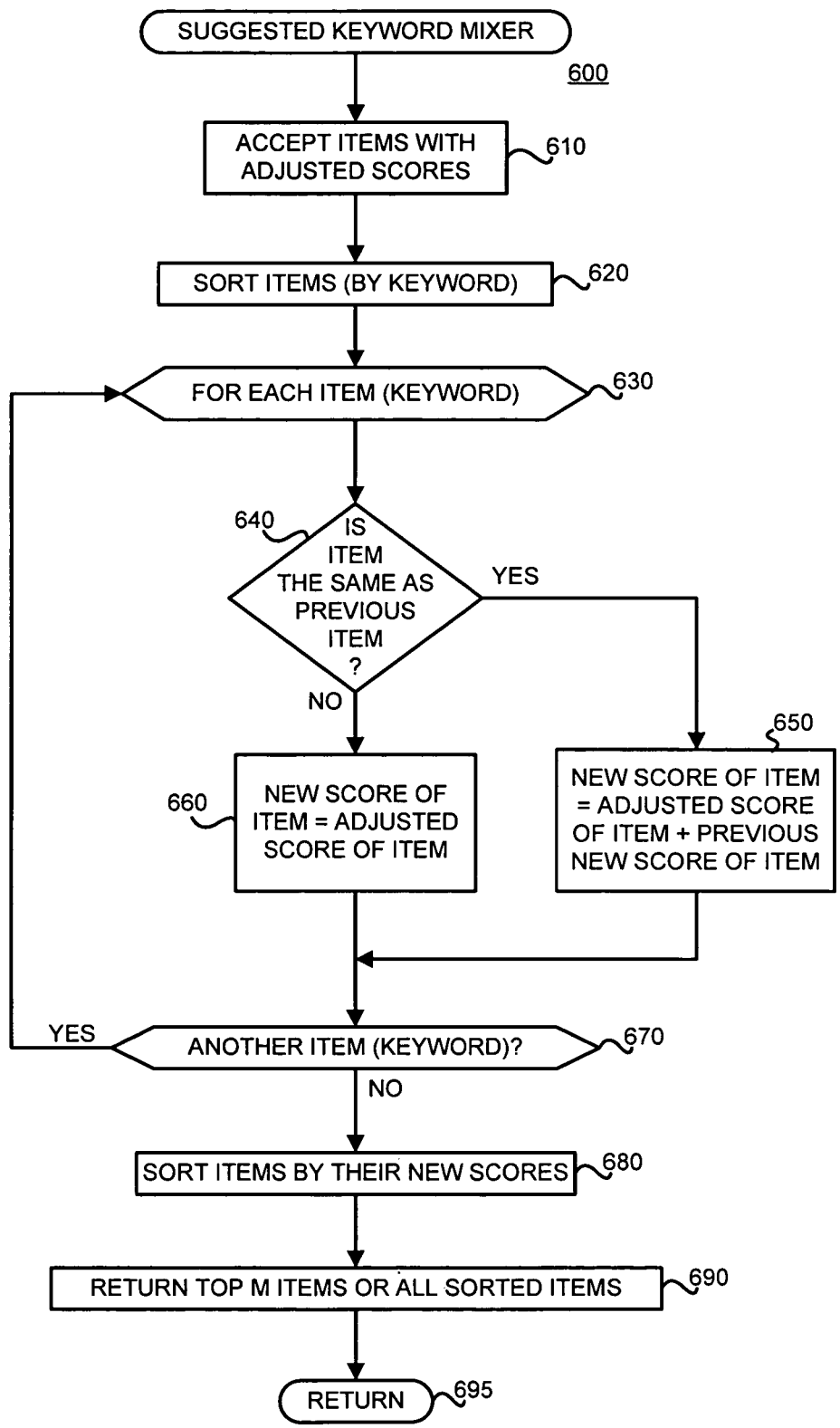
FIG. 6 is a flow diagram of an exemplary method for mixing suggested items (e.g., targeting keyword suggestions) a manner consistent with the present invention.

FIG. 6 is a flow diagram of an exemplary method 600 that may be used to mix suggested items (e.g., targeting keyword suggestions) in a manner consistent with the present invention. Items (e.g., targeting keyword suggestions) with adjusted scores may be accepted (Block 610) and sorted (Block 620). As indicated by loop 630 670, a number of acts may be performed for each of a number of items. For example, it may be determined whether the item is the same as the previous item. (Block 640) If it is not the same, a new score for the item may simply be set to the adjusted score of the item (Block 660), and the next item, if any, is processed (Block 670). If, on the other hand, an item is the same as the previous item, a new score of the item may be set to the adjusted score of the item plus a previous new score of the item (Block 650), and the next item, if any, is processed (Block 670). If all of the items have been processed 670, they may be sorted by their new scores. (Block 680) The top M items, or all sorted items, may then be returned (e.g., for presentation to a user or use by another process) (Block 690) before the method 600 is left (Node 695).

Referring back to loop 630-670, the new score of items "i" may be expressed as follows:

$$S_{new:i} = \sum_{for\ all\ tools\ j} S_{adjusted:i,j} \quad (4)$$

As can be appreciated from the foregoing, at least one exemplary embodiment consistent with the present invention may operate as follows. For each suggestion tool TLi, drop all suggestions Kij with scores Sij<=0 since such suggestions are negatives that may have already been incorporated. If nothing is left, the suggestion tool is done. Otherwise, all Ni of the positive scores Sij>0 are summed and a variable Ti is set to the total. Each positive Sij is replaced with a combination (e.g., 50% and 50% in this example) of two probability distributions—50% is Sij/Ti, which is simply the ratio of the score to all scores; and 50% follow the Zipf distribution, which is proportional to 1/rank, properly normalized to add up to 1. The former component reflects a cardinal aspect of the suggestion, while the later component reflects an ordinal aspect of the suggestion.

§4.3.2 Exemplary Apparatus

Figure 7:
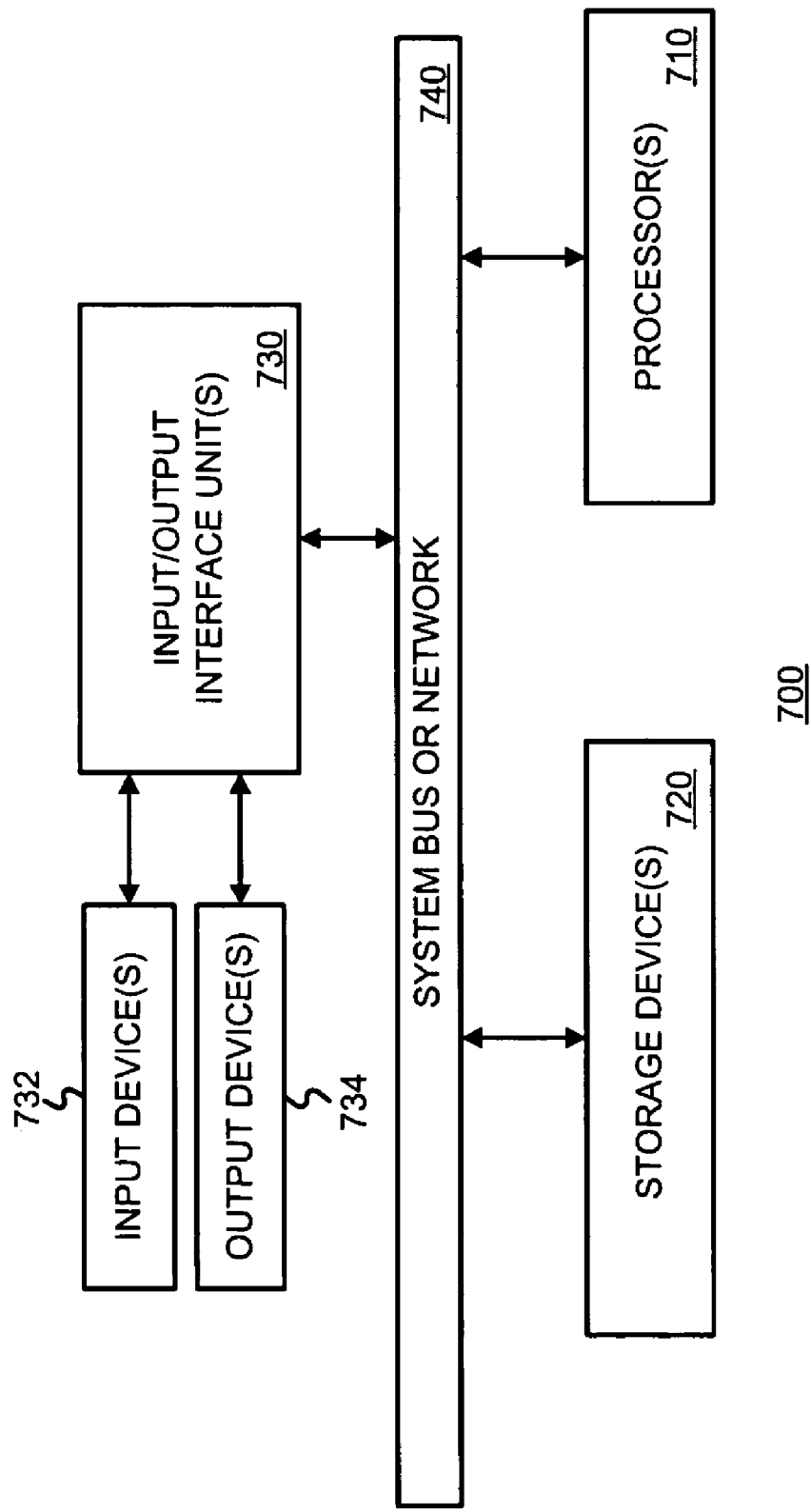
FIG. 7 is a block diagram of an exemplary apparatus that may perform various operations and store various information in a manner consistent with the present invention.

FIG. 7 is high-level block diagram of a machine 700 that may perform one or more of the operations discussed above. The machine 700 includes one or more processors 710, one or more input/output interface units 730, one or more storage devices 720, and one or more system buses and/or networks 740 for facilitating the communication of information among the coupled elements. One or more input devices 732 and one or more output devices 734 may be coupled with the one or more input/output interfaces 730.

The one or more processors 710 may execute machine-executable instructions (e.g., C or C++ running on the Solaris operating system available from Sun Microsystems Inc. of Palo Alto, Calif., the Linux operating system widely available from a number of vendors such as Red Hat, Inc. of Durham, N.C., Java, assembly, Perl, etc.) to effect one or more aspects of the present invention. At least a portion of the machine executable instructions may be stored (temporarily or more permanently) on the one or more storage devices 720 and/or may be received from an external source via one or more input interface units 730.

In one embodiment, the machine 700 may be one or more conventional personal computers, mobile telephones, PDAs, etc. In the case of a conventional personal computer, the processing units 710 may be one or more microprocessors. The bus 740 may include a system bus. The storage devices 720 may include system memory, such as read only memory (ROM) and/or random access memory (RAM). The storage devices 720 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media, etc.

A user may enter commands and information into the personal computer through input devices 732, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 710 through an appropriate interface 730 coupled to the system bus 740. The output devices 734 may include a monitor or other type of display device, which may also be connected to the system bus 740 via an appropriate interface. In addition to (or instead of) the monitor, the personal computer may include other (peripheral) output devices (not shown), such as speakers and printers for example.

Referring back to FIG. 2, one or more machines 700 may be used as ad server 210, search engine 220, content server 230, e-mail server 240, and/or user device 250.

§4.3.3 Alternatives and Extensions

In at least one embodiment consistent with the present invention, targeting keyword suggestions may come in three types—refinements, broadenings and expansions. Refinement type suggestions are more specific keywords, which are already covered by the seed keywords. These are usually suggested to give advertisers the gist of the types of queries they may match, so they could scan these, make sure they make sense, and provide ideas for what to negate (for example, the seed "lottery" may produce refinements like "virginia lottery," "green card lottery," and so on, suggesting that "green card" should be negated, without actually providing more coverage, since they are all covered by "lottery" already). Broadening type suggestions include everything that's not a refinement that may be produced as a rewrite by a broadening system (this system rewrites user queries to increase targeting . . . if the query "hotel" could be rewritten to "hotels," someone targeting "hotels" may have their ads shown on "hotel," even if they are not actually targeting "hotel"). Expansion type suggestions include everything else. For example, the targeting keyword suggestion may be classified as a "refinement" suggestion if any of its variants is covered by the seed(s) provided to the suggestion tool. The targeting keyword suggestion may be classified as a "broadening" type suggestion if it is not a "refinement" type, but came from a broadening source. The targeting keyword suggestion may be classified as an "expansion" type suggestion if it is neither a "refinement" type, nor "broadening" type suggestion.

In at least one embodiment consistent with the present invention, all negations applied to a particular piece of text can be saved so various negations provided by different suggestion tools can be merged.

In at least one embodiment consistent with the present invention, all languages assigned to a piece of text can be tracked. In this way, unwanted languages can be filtered out. Further, if there is ever a disagreement, the language may be considered to be unknown.

In at least one embodiment consistent with the present invention, all of the keywords are parsed, and a list of all possible forms for each is maintained. This accounts for hyphenation, compound German words, CJK (Chinese-Japanese-Korean) segmentation, etc.

In at least one embodiment consistent with the present invention, unwanted targeting keyword suggestions (e.g., suggestions already targeted, trademarks, bad words, unwanted keyword types, etc.) may be filtered out.

In at least one alternative embodiment consistent with the present invention, top results may be picked at random or under a fair (e.g., round-robin) scheme from each of the multiple sources, until the required number of suggestions is obtained, or until all sources are exhausted.

In at least one alternative embodiment consistent with the present invention, the number of different experts suggesting any given item could be determined, and the items may be sorted by the determined number, possibly resolving ties by sums of scores.

In at least one alternative embodiment consistent with the present invention, a number M of desired items could be determined by taking all items from the most trusted source, then everything not already covered from the next most trusted source, and so on, until the results reach the number of desired items, or all of the items have been used. The final set of items will have been sorted based on score within each source, and based on the level of trust of the source.

Although the present invention was described in the context of keyword suggestions, the principles of the present invention can be applied to other tools which generate ordered and/or scored suggestions.

§4.4 EXEMPLARY OPERATIONS IN AN EXEMPLARY EMBODIMENT

Figure 8:
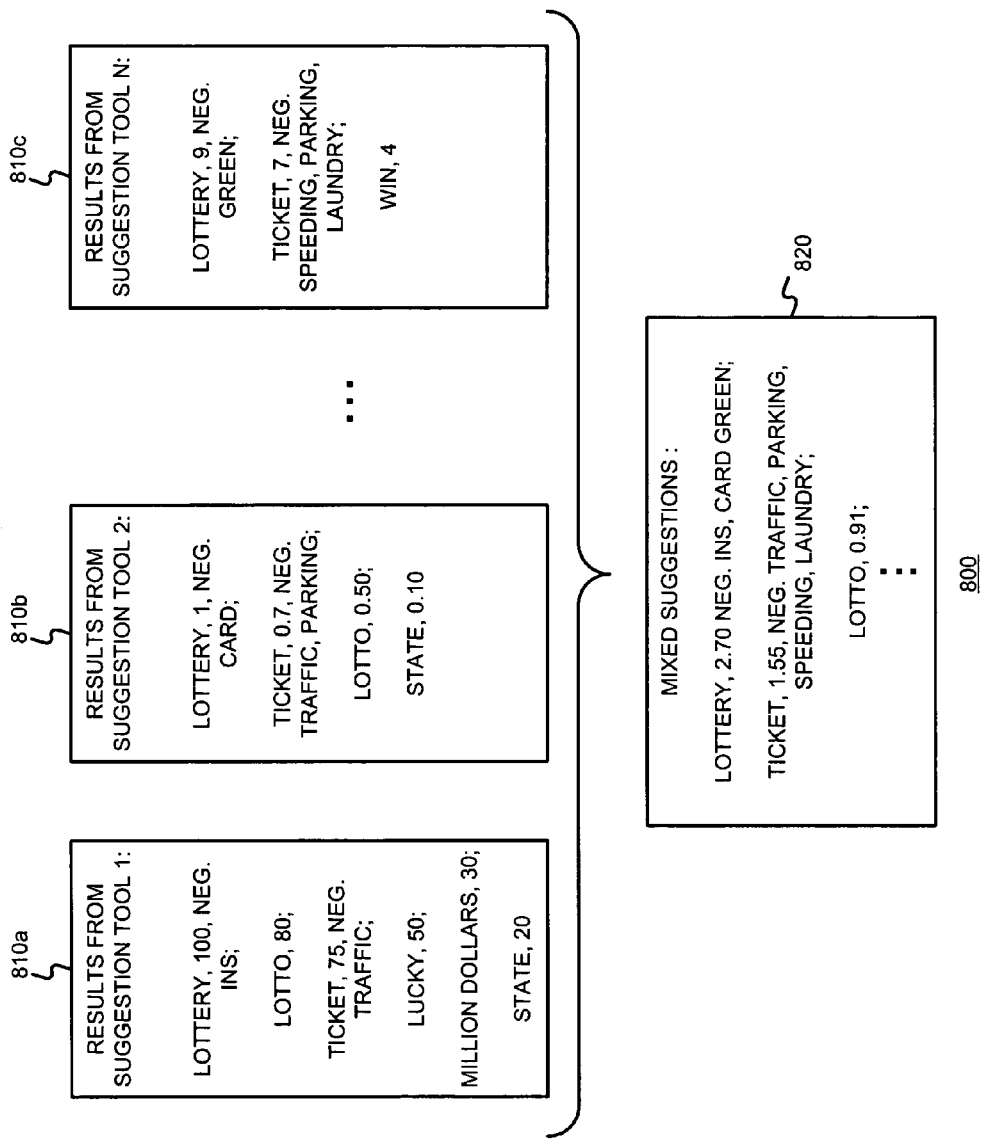
FIG. 8 illustrates the mixing of keyword suggestion results recommended from three suggestion tools in an exemplary embodiment consistent with the present invention.

FIG. 8 illustrates the mixing of keyword suggestion results recommended from three suggestion tools in an exemplary embodiment consistent with the present invention. The new homogeneous (intraset) scores for each of the suggestions of the first set 810*a*, as determined using the exemplary formula (2) are as follows:

| | | |
|---|---|---|
| LOTTERY | 0.34 | $= .5(100/355) + .5(1/2.45)$ |
| LOTTO | 0.21 | $= .5(80/355) + .5(1/2/2.45)$ |
| TICKET | 0.17 | $= .5(75/355) + .5(1/3/2.45)$ |
| LUCKY | 0.12 | $= .5(50/355) + .5(1/4/2.45)$ |
| MILLION DOLLARS | 0.08 | $= .5(30/355) + .5(1/5/2.45)$ |
| STATE | 0.06 | $= .5(20/355) + .5(1/6/2.45)$ | where $355 = 100 + 80 + 75 + 50 + 30 + 20$, and $2.45 = 1 + \frac{1}{2} + \ldots + \frac{1}{6}$.

The new homogeneous (intraset) scores for the suggestions of the second set 810*b*, as determined using the exemplary formula (2) are as follows:

| | | |
|---|---|---|
| LOTTERY | 0.46 | $= .5(1/2.3) + .5(1/2.08)$ |
| TICKET | 0.27 | $= .5(0.7/2.3) + .5(1/2/2.08)$ |
| LOTTO | 0.19 | $= .5(0.5/2.3) + .5(1/3/2.08)$ |
| STATE | 0.08 | $= .5(0.1/2.3) + .5(1/4/2.08)$ | where $2.3 = 1.0 + 0.7 + 0.5 + 0.1$, and $2.08 = 1 + \frac{1}{2} + \frac{1}{3} + \frac{1}{4}$.

Finally, the new homogeneous (intraset) scores for the suggestions of the second set 810*c*, as determined using the exemplary formula (2) are as follows:

| | | |
|---|---|---|
| LOTTERY | 0.50 | $= .5(9/20) + .5(1/1.83)$ |
| TICKET | 0.31 | $= .5(7/20) + .5(1/2/1.83)$ |
| WIN | 0.19 | $= .5(4/20) + .5(1/3/1.83)$ | where $20 = 9 + 7 + 4$, and $1.83 = 1 + \frac{1}{2} + \frac{1}{3}$.

Assuming that the trust factor weight for each suggestion tool is the same, and using equations (3) and (4) yields new scores:

| | | |
|---|---|---|
| LOTTERY | 2.70 | = 0.43(2.45) + 0.46(2.08) + 0.5(1.83) |
| TICKET | 1.55 | = 0.17(2.45) + 0.27(2.08) + 0.31(1.83) |
| LOTTO | 0.91 | = 0.21(2.45) + 0.19(2.08) |
| | . | |
| | . | |

Notice also that the negations (negative keyword suggestions) are merged. For example, for the targeting keyword suggestion LOTTERY, the negations INS, CARD, and GREEN from result sets 810a, 810b, and 810c, respectively, are merged. Similarly, for the targeting keyword suggestion TICKET, the negations TRAFFIC, PARKING, SPEEDING and LAUNDRY from the various result sets are merged.

§4.5 CONCLUSIONS

As can be appreciated from the foregoing, the present invention allows results from various suggestion tools to be mixed together in a meaningful way. The unified results may be ordered by some measure of quality or relevance, from top to bottom. The present invention allows various suggestion tools to handle the problem of generating suggestions, such as targeting keyword suggestions for example, in different ways, and permits such suggestion tools to be provided as separate isolated components or modules so that the different approaches can be implemented separately, without complicating each other. If some suggestion tools take too long, they may be interrupted.

What is claimed is:

1. A machine-implemented method comprising:
   receiving a request for keyword suggestions, the request including a seed keyword with which the keyword suggestions are to be generated;
   accepting, from two or more keyword suggestion tools, at least two heterogeneous sets of keyword suggestions for an online advertisement, wherein each set of keyword suggestions includes targeting keyword suggestions that are ranked and scored by a keyword suggestion tool that suggested the set of keyword suggestions, and wherein targeting keyword suggestions in each set of targeting keyword suggestions have been generated based on the seed keyword;
   for each heterogeneous sets of keyword suggestions accepted from the at least two or more keyword suggestion tools, determining, by one or more processors, a new normalized score for each of the targeting keyword suggestions in the heterogeneous set of keyword suggestions, wherein the new normalized score is computed based on a cardinal aspect of the targeting keyword suggestion and an ordinal aspect of the targeting keyword suggestion in the heterogeneous set of keyword suggestions, the cardinal aspect representing an absolute score corresponding to the targeting keyword suggestion and the ordinal aspect representing a rank of the targeting keyword suggestion in the heterogeneous set of keyword suggestions, and wherein the new normalized score for each targeting keyword suggestion in a particular set of heterogeneous keyword suggestions is defined as a sum of a first weight multiplied by the cardinal aspect and a second weight multiplied by the ordinal aspect;
   generating, by the one or more processors, an adjusted new score for each targeting keyword suggestion based on a result of a function of a new normalized score corresponding to the targeting keyword suggestion and trust factor of a keyword suggestion tool from which the targeting keyword was accepted, the trust factor representing a measure of reliability of the keyword suggestion tool;
   combining, by the one or more processors, the targeting keyword suggestions scored by a first keyword suggestion tool selected from the at least two or more keyword suggestion tools and the targeting keyword suggestions scored by a second suggestion tool selected from the at least two or more keyword suggestion tools using the new scores to generate a combined set of ordered and scored suggestions according to the adjusted new score for each targeting keyword suggestion; and
   providing the combined set of keyword suggestions to a user device.

2. The machine-implemented method of claim 1 wherein the ordinal aspect of a ranked targeting keyword suggestion is defined as:

$$\frac{\frac{1}{rank_{targeting\ keyword\ suggestion}}}{\sum_{for\ all\ targeting\ keyword\ suggestions\ of\ the\ heterogeneous\ set_j} 1/rank_{targeting\ keyword\ suggestion_j}}.$$

3. The machine-implemented method of claim 1 wherein the cardinal aspect of a scored targeting keyword suggestion is defined as a score of the targeting keyword suggestion divided by a sum of scores of all targeting keyword suggestions of the heterogeneous set of keyword suggestions.

4. The machine-implemented method of claim 1 wherein a sum of the first and second weights is one.

5. The machine-implemented method of claim 4 wherein the first weight is equal to the second weight.

6. The machine-implemented method of claim 1 wherein each of the targeting keyword suggestions includes information for targeting the servicing of an online advertisement.

7. The machine-implemented method of claim 1 wherein each of the targeting keyword suggestions includes a keyword type.

8. The machine-implemented method of claim 7 wherein the keyword type is selected from a set consisting of (A) refinement, (B) broadening, (C) expansion, (D) negative.

9. The machine-implemented method of claim 7 further comprising removing targeting keyword suggestions belonging to an unwanted keyword type.

10. The machine-implemented method of claim 1 further comprising: removing targeting keyword suggestions already targeted.

11. The machine-implemented method of claim 1 further comprising: removing targeting keyword suggestions that are trademarks.

12. The machine-implemented method of claim 1 further comprising: removing targeting keyword suggestions determined to be bad words.

13. The machine-implemented method of claim 1 further comprising: for each of the at least two heterogeneous sets of keyword suggestions, and for each new normalized score for each of the keyword suggestions of the heterogeneous set of keyword suggestions, adjusting the new normalized score to generate an adjusted new score so that a sum of the adjusted new scores for each of the sets equals the same value.

14. The machine-implemented method of claim 1 further comprising: for each of the at least two sets of keyword suggestions, and for each new normalized score for each of the keyword suggestions of the heterogeneous set of keyword suggestions, adjusting the new normalized score to generate an adjusted new score so that a sum of the adjusted new score for each of the sets equals one.

15. The machine-implemented method of claim 14 wherein the act of adjusting the new normalized score includes multiplying the new normalized score by:

$$1+\frac{1}{2}+\ldots+\frac{1}{n}.$$

where n is the number of targeting keyword suggestions in the heterogeneous set of keyword suggestions.

16. The machine-implemented method of claim 1 wherein each of the targeting keyword suggestions includes a keyword used to target the serving of an online advertisement and a language.

17. The machine-implemented method of claim 16 further comprising: removing targeting keyword suggestions having an unwanted language.

18. The method of claim 1, further comprising:
- receiving, for a keyword suggestion tool, performance feedback that represents a measure of keyword suggestion tool performance; and
- adjusting the trust factor of the keyword suggestion tool based on the performance feedback.

* * * * *